(12) United States Patent
Moniz et al.

(10) Patent No.: US 10,521,272 B1
(45) Date of Patent: Dec. 31, 2019

(54) TESTING IN GRID COMPUTING SYSTEMS (71) Applicant: Amazon Technologies, Inc., Seattle, WA (US)

(72) Inventors: Samuel Leonard Moniz, Cambridge, MA (US); Jacob William Beacham, Redmond, WA (US); Arjun Karande, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 15/085,680

(22) Filed: Mar. 30, 2016

(51) Int. Cl.
*G06F 9/46* (2006.01)
*G06F 9/50* (2006.01)
*G06F 9/48* (2006.01)
*G06F 9/445* (2018.01)
*G06F 11/36* (2006.01)

(52) U.S. Cl.
CPC ............ *G06F 9/5072* (2013.01); *G06F 9/445* (2013.01); *G06F 9/4843* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 6,192,108 B1* | 2/2001 | Mumford | .............. | H04M 3/242 379/10.03 |
| 7,721,290 B2* | 5/2010 | Horikawa | ............. | G06F 9/4862 709/201 |
| 8,024,299 B2* | 9/2011 | Dias | .................. | G06F 17/30286 707/660 |
| 8,595,714 B1* | 11/2013 | Hamer | ...................... | G06F 8/65 709/201 |
| 2004/0015600 A1* | 1/2004 | Tiwary | ................ | G06F 11/3414 709/234 |
| 2006/0048161 A1* | 3/2006 | de Rose | ................ | G06F 9/5072 718/105 |
| 2009/0144742 A1* | 6/2009 | Subhraveti | ............ | G06F 11/203 718/104 |
| 2009/0235257 A1* | 9/2009 | Komatsu | ................. | G06F 9/541 718/101 |
| 2012/0110590 A1* | 5/2012 | Ghosh | ................... | G06F 9/5083 718/104 |

(Continued)

*Primary Examiner* — Diem K Cao
(74) *Attorney, Agent, or Firm* — Patterson + Sheridan, LLP (57) ABSTRACT

Techniques are disclosed for testing applications and systems used to provide a high performance computing (HPC) system, such as a cluster or grid. A grid computing system is tested using a "shadow mode" approach, where information regarding a parallel computing job launched on a first instance of a computing grid is recorded, stored, and used to replay the parallel computing job on a second instance of the computing grid. For example, the parallel computing job may be executed using a production build of grid applications and replayed on a candidate build of grid applications. Output from executing the parallel computing job is also captured in order to provide a reference result which may be compared with candidate results generated by replaying the parallel computing job. The parallel computing job may specify a set of inputs and execution logic along with any other requirements or dependencies needed to accurately replay the parallel computing job.

20 Claims, 8 Drawing Sheets (56) References Cited

U.S. PATENT DOCUMENTS

| | | | | |
|---|---|---|---|---|
| 2012/0221519 | A1* | 8/2012 | Papadomanolakis | ........................ G06F 11/3688 707/615 |
| 2013/0066952 | A1* | 3/2013 | Colrain | ............... G06F 11/1438 709/203 |
| 2013/0066955 | A1* | 3/2013 | Neel | ..................... H04L 67/146 709/203 |
| 2013/0073750 | A1* | 3/2013 | Nakane | .............. H04N 1/00244 710/19 |
| 2016/0103677 | A1* | 4/2016 | Melski | ...................... G06F 8/71 717/120 |

* cited by examiner

TESTING IN GRID COMPUTING SYSTEMS

BACKGROUND

High-performance computing (HPC) generally refers to the use of parallel processing systems to run application programs efficiently, reliably, and quickly. HPC allows scientists and engineers to solve complex science, engineering, and business problems using applications that require high bandwidth, enhanced networking, and very high compute capabilities. Two common approaches used to support HPC include grid computing and cluster computing.

Cluster computing systems are typically assembled using large numbers of server systems and CPUs, for example, using racks of commodity servers connected by high-performance network interconnects. In contrast, grid computing systems are often assembled over a wide area using a heterogeneous collection of servers and CPU types. Typically, nodes in the grid can inform what computing resources are available (e.g., CPU cores and memory) to a manager node and the manager node can offer these resources to frameworks. The frameworks can then schedule tasks to run using the available resources. This approach has led to large scale grid systems sometimes referred to as "data center computing," where rather than running several specialized clusters or grids for individual applications (each at relatively low utilization rates) mixed workloads all run on the same cluster. Doing so improves scalability, elasticity, fault tolerance, and performance utilization.

While enterprises can build and maintain the physical computing infrastructure to host both HPC grids and clusters, HPC systems can also be built using cloud computing services. Generally, cloud computing services allow an enterprise to access large amounts of computing resources without having to maintain an underlying physical infrastructure. For example, cloud computing services allow an enterprise to launch large numbers virtual computing instances—commonly referred to as virtual machines—which can run arbitrary applications. In addition to compute services (e.g., virtual machine instances), cloud computing services can also provide database, persistent storage, networking, load balancing, auto-scaling, messaging, cloud formation services, monitoring services, etc.

Moreover, cloud computing services may offer access to HPC grids or clusters. For example, a cloud computing service could allow an enterprise to launch and configure a fleet of virtual machine instances configured to operate as nodes in an HPC grid or cluster. Similarly, a cloud computing service could offer access to HPC grids using a variety of available frameworks and cluster management tools. Enterprises could use the HPC grid to access variable numbers of servers (or virtual machine instances) as grid nodes. One challenge faced by operators of HPC systems such as these is that changes or updates to the frameworks and cluster management applications should be tested before being put into production use.

BRIEF DESCRIPTION OF DRAWINGS

Various embodiments in accordance with the present disclosure will be described with reference to the drawings, in which.

DETAILED DESCRIPTION

Testing the applications and systems included in high performance computing (HPC) grids and clusters presents a number of challenges. For example, performing unit and integration tests for a grid deployment (e.g., for framework applications, cluster manager applications, and node executors, etc.) typically involves writing code to generate test traffic submitted to test some aspect of the computing grid. The results of the test traffic can be compared with expected results. While this approach works, it relies on developers to manually write a single test (or set of tests) for each system or component that needs testing as well as to create test traffic and correctly specify the expected results for a given test. Further, this approach results in tests that need to be regularly updated to ensure evolving features of the grid are tested as well as results in tests that do not adapt to upstream changes, e.g., where users include additional inputs to the grid during testing. The same issues arise for new builds of cluster managers, framework components, and specialized APIs running over a given framework. Similarly, it can be difficult for operators of a computing grid to capture performance metrics regarding the resources consumed by a given unit of work, as the nodes acting on that unit of work are shared by multiple jobs.

At the same time, it is important that users have confidence that updates or changes to grid applications do not change the computing results generated by the HPC grid. Embodiments presented herein provide techniques for testing applications and systems used to provide an HPC computing system, such as a cluster or grid. In one embodiment, a grid computing system is tested using a "shadow mode" approach, where information regarding jobs launched on the grid is recorded, stored, and used to replay a recorded job. For example, each job may specify a set of inputs and execution logic, which may be captured and persisted while executing the job. Output from a job is also persisted in order to provide a reference result (or a candidate results evaluated against the reference result). Once persisted, the job may be replayed.

For example, tasks dispatched to a node running a current production build of a grid may be used to generate a reference output for a test based on such tasks. In turn, the dispatched tasks may be replayed on nodes running a new build of the grid applications to generate a candidate result. The candidate result is compared with the reference result. That is, data output when the job is replayed against the new build is captured and compared against the reference result. The comparison may be used to assert there is no regression or report on any identified differences. This approach allows nodes running a new build of a grid application to be tested, without having to manually compose and update tests.

In one embodiment, the grid is configured to capture information from actual user jobs in order to replay such jobs against other instances of the grid (e.g., testing a new grid configuration) against new builds of grid elements (e.g., node agents, frameworks, cluster managers, etc.). In other cases, a given job may be multiplexed or redirected to different grids in parallel—allowing results to be compared and evaluated. In one embodiment, before an update or change is deployed to a computing grid, a specified set of production traffic is captured in order to build a reference test, such as a specified percentage of production jobs, jobs submitted over a certain period of time, or specifically identified jobs submitted to the grid. Information about the user job, along with the tasks dispatched to execute the job, provides a test that can be replayed on updated grid nodes. In addition, the job may also be replayed against the same grid used to capture the job. For example, after recording a job (producing a reference set of results), the job may be replayed on the same grid to produce a replay output. Differences between the replay output and the reference results can typically be discarded as output that may be transient or changing between runs of the same job. The remaining replay output can then provide a reference result for comparison with results generated by replaying the job on a different grid or cluster.

In one embodiment, a computing grid may include a job submission service used to support job capture and replay. Because grid frameworks can accept jobs with generally arbitrary inputs and outputs as well as jobs which include local references or otherwise transient artifacts, the job submission service may provide an abstraction of a parallel computing job, i.e., the job submission service may act as a well-defined service for submitting jobs to the grid. Rather than submitting jobs according to a given grid framework directly (or according to a specialized API associated with that framework), users access the computing grid by submitting jobs to the job submission service. Generally, for jobs submitted to the job submission service, users fully specify the inputs used by a given job, the location of job related data and other artifacts, and specify outputs produced by the job (as well as locations where such outputs are stored). When a job is received, the job submission service captures a definition of that computing job prior to it being executed by the grid.

In one embodiment, a description of the inputs, outputs, and any related artifacts may be embedded in a job container submitted to the job submission service. The job container may store a copy of any job-related artifacts needed to run the job that might change between runs or that may not be accessible to systems later replaying the job, such as local files, objects, or scripts. This approach avoids problems in replaying jobs resulting from artifacts that change between runs (e.g., version of a script changing) or resulting from such transient artifacts not being available to the framework (e.g., local content available to a user submitting a job to the framework).

The job container could also specify where to store output produced by a run of the job. In cases where the job is run multiple times, the output may be persisted in between runs to prevent the results of a first run (e.g., a reference run performed using a production grid) from being overwritten by a second run (e.g., a run of a candidate grid build). In other cases, a user could specify storage requirements for job output, and the job submission service may select a storage location to store job results. For example, in the case of a cloud based computing grid, the job submission service could write output data to a persistent storage service offered by the cloud service provider hosting the computing grid. The location could be selected, e.g., based on storage requirements specified by a user in the job container.

Additionally, a job container may specify what data is processed or evaluated by the job as well as where the input data is stored. In some cases, a copy of the input data used by a job may be persisted as well. As known however, grid computing tasks may be configured to process extremely large datasets. Thus, in many cases, it may be impractical to capture a copy of the data associated with a given parallel computing job. In one embodiment, after performing a reference run to capture jobs submitted to the grid for replay, a candidate run replaying the jobs against a new grid instance may be performed before the underlying dataset processed by the reference run is expected to change. In other cases, the reference and candidate run could be performed generally in parallel, e.g., on a production grid (to produce a reference result set) and a second grid (to produce a candidate result set for evaluation). For example, in one embodiment, a cluster manager could be configured to redirect (or multiplex) certain tasks dispatched by a job framework to a node selected by the cluster manager.

Further, embodiments presented herein provide techniques to capture performance metrics for nodes in a computing grid. For example, in one embodiment, a given task dispatched to a computing grid may be replayed on an otherwise unused or idle grid node, allowing rich metrics to be captured for that task. This approach may also be used to control for grid-state when testing performance changes, e.g., by replaying the same task on multiple nodes, each with a different node configuration.

Advantageously, techniques disclosed herein provide approaches for testing a computing grid that are scalable, accurate, and effective. Because grid computing jobs change regularly and often include dependencies, capturing a fully specified job description allows a parallel computing job to be replayed with high-fidelity—both from a user-level perspective of the user job submitted to the computing grid and from a grid-level perspective of tasks dispatched to nodes of the computing grid when executing the parallel computing job. Thus, the results of executing a parallel computing job on a reference computing grid may be compared with results obtained by replaying the parallel computing job on a candidate computing grid. Doing so helps ensure that changes or updates to grid applications are effectively tested before being put into production use.

Note, some embodiments are described herein relative to an example of a computing grid which includes certain well-known open source projects, including the Apache Spark cluster framework and the Apache Mesos cluster manager (among others). However, one of skill in the art will readily recognize that embodiments presented herein may be adapted for a variety of grid computing or cluster computing applications, systems, and frameworks. Additionally, some embodiments are described relative to an example of a computing grid hosted by a cloud computing service provider. However, one of skill in the art will readily recognize that embodiments presented herein may be adapted for HPC systems, applications, or services hosted using an enterprise computing infrastructure.

Figure 1:
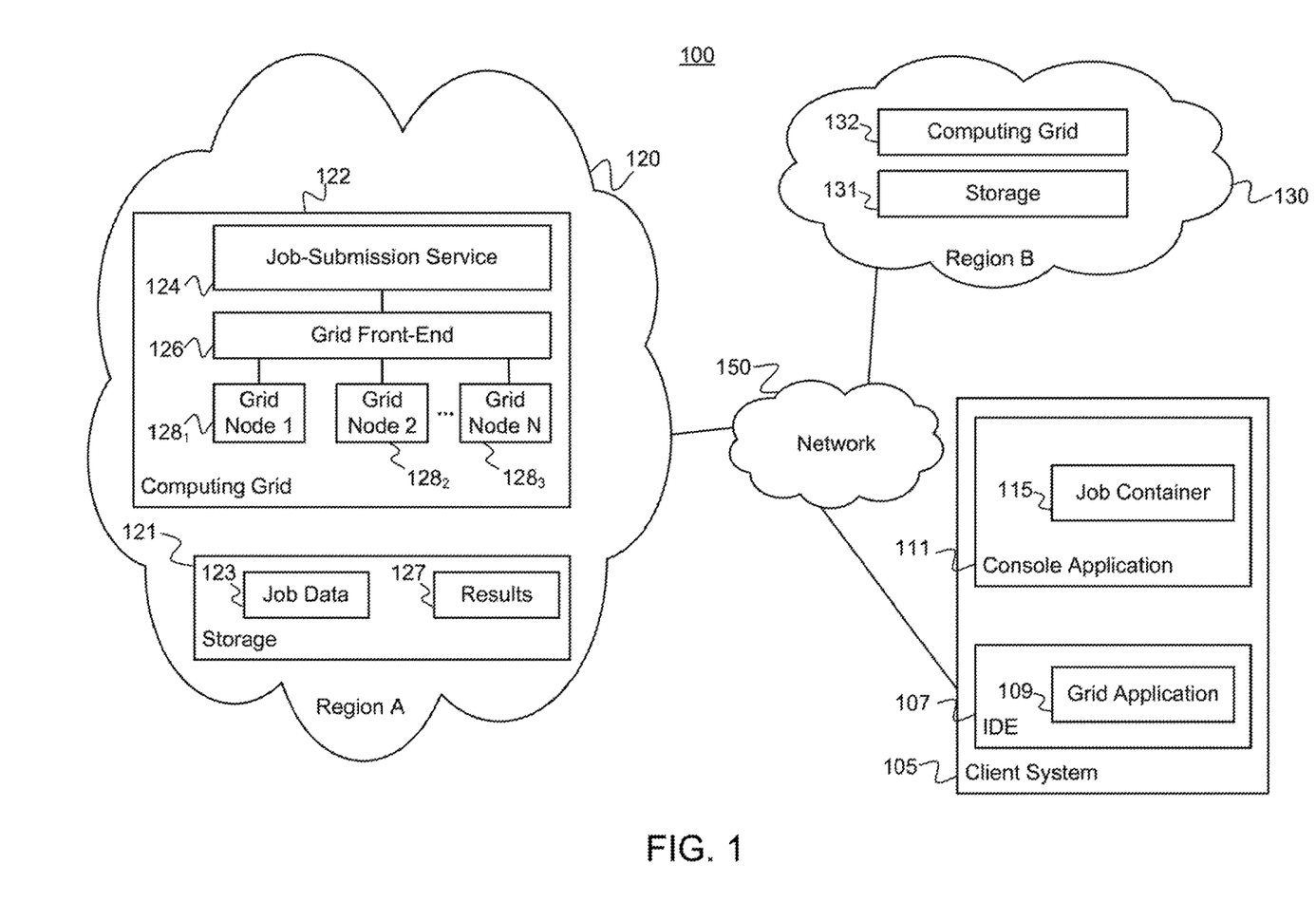
FIG. 1 illustrates an example of a computing environment which supports shadow mode testing, according to one embodiment.

FIG. 1 illustrates an example of a computing environment 100 which supports shadow mode testing, according to one embodiment. As shown, the computing environment 100 includes a client computing system 105, and two cloud computing regions—region A 120 and region B 130, each connected to a public computing network 150 (e.g., the internet).

Cloud computing regions 120, 130 generally correspond to a region defined by a service provider in offering cloud based services to clients (e.g., the access to the computing grids 122, 132). Users may develop and submit applications for execution on the computing grids 122, 132 in regions 120, 130. While cloud computing regions may be drawn along arbitrary boundaries, cloud computing regions often correspond to geographic, national, or fault tolerance boundaries, where computing resources in one region are deployed and managed in a manner that is generally isolated from other regions. For example, cloud computing regions 120, 130 may each correspond to a data center (or data centers) located in a particular geographic area. Data centers in different regions may help provide fault-tolerant services, e.g., should a data center in one region become inaccessible, other data centers in that region (or other regions) may continue to operate with little or no interruption to the services hosted in such regions. Further, the provider may enable multiple physical or logical zones within a given cloud computing region. For example, a single data center used to provide a cloud computing region may offer multiple, fault tolerant availability zones, where a service disruption in one availability zone does not impact other availability zones within the same cloud computing region (or other regions) and the availability zones within a region may provide inexpensive, low-latency network connectivity to other availability zones within the same region.

For the example of FIG. 1, assume a cloud based service has deployed a computing grid 122 in region A 120 and computing grid 132 in region B each of which can accept and execute user jobs against a collection of grid computing nodes. As shown, the computing grid 122 includes a job submission service 124, grid front-end 126, and a collection of three grid nodes $128_{1-3}$ Of course, grid computing systems often include hundreds or thousands of nodes (or more).

Grid front-end 126 is included to be representative of a variety of high performance computing (HPC) components that provide a platform to execute user applications on a computing grid or cluster. In some cases, grid front-end 126 includes a framework and cluster manager used to execute a grid application 109 on the grid nodes 128. For example, the grid front-end 126 could include the Apache Spark cluster framework and Apache Mesos cluster manager. In such a case, users develop grid application 109 based on the Apache Spark framework to perform actions and transformations against a resilient distributed dataset (RDD) (which provides a collection of items partitioned across the nodes 128 of the grid 122 and operated on in parallel). The framework then schedules tasks associated with the job for execution on nodes of the cluster, based on offers of available grid node resources advertised to the framework by the cluster manger. Once scheduled on a grid node, a framework component executes a given task scheduled on that grid node 128 using available resources as allocated for that task by the cluster manager. The grid front-end 126 could include additional APIs or framework components that operate on RDDs such as APIS for data dataset searching, streaming, and machine learning. Of course, the specific data structures and APIs available to build a grid application 109 will vary depending on the framework and cluster management used in a particular case.

Region A 120 also includes persistent storage 121 used to store job data 123 accessed by grid nodes 128 (e.g., an HDFS file system storing an RDD while executing grid application 109) and results 127 (e.g., results generated by the computing grid executing a grid application).

In one embodiment, rather than submitting a grid computing job directly to the grid front-end 126, users submit jobs to a job submission service 124. In turn, jobs received by the job submission service 124 may be submitted to the grid front-end 126 for execution on the computing grid 122. However, in some cases, the job submission service 122 may store a copy of a grid computing job. The job submission service 124 may also record what tasks are dispatched to the nodes 128 by the computing grid 122 when the grid computing job runs, allowing that job to be replayed. Doing so allows changes or updates to the grid nodes 128 (or other components of the computing grid 122) to be evaluated. For example, before updating or changing a production build of the grid software on nodes 128, the job submission service 124 may record the activity of some number of production computing jobs to create a reference job run. The reference job run can then be replayed after the software on the grid nodes 128 has been updated. Doing so allows the enterprise hosting computing grid 122 to evaluate the updated applications on grid nodes 128 by comparing the results of the reference job run with the results obtained by replaying the job after the grid nodes 128 have been updated.

In one embodiment, the job submission service 124 may capture both the grid application 109 submitted in a computing job along with any additional information needed to accurately replay that computing job. For example, in addition to the grid application 109, the job submission service 124 may capture and save a copy of any local scripts, resources, or other artifacts or external references included in a job request submitted to the service 124.

Client system 105 is included to be representative of a general purpose computing system such as desktop and laptop computer systems, as well as representative of mobile computing devices such as tablets and smart phones configured with service console applications, web browser software, or development tools. In this particular example, client system 105 includes an integrated development environment (IDE) 107 and grid application 109. The IDE 107 generally provides a programming environment used to develop software applications, such as grid application 109. Accordingly, the IDE 107 may include components such as a code editor, compiler, and debugger, etc.

Illustratively, the client system 105 also includes a console application 111 which includes a job container 115. The console application 111 allows users to access the computing grid 122 hosted in cloud computing region 120. For example, the service provider hosting grid 122 may distribute console or command line tools, client applications, web consoles, or other tools used to access services hosted by the provider. In the present context, the console application 111 allows a user to submit a job container 115 to the job submission service 124 and to access results generated by jobs executed on the computing grid 122. In one embodiment, the job container provides a fully-specified description of a job to execute on the computing grid 122. The job container 115 may include an application package to launch on the grid, e.g., grid application 109, specify a location of input data used by the jobs (e.g., an HDFS partition within storage 121), a location where job results are stored (e.g., a folder on a virtual block store) and copies of (or resolvable references to) any other artifacts or resources needed to execute, and later replay, grid application 109. As noted, capturing this information prevents problems in replaying jobs resulting from artifacts that change between runs (e.g., an instance version of a script used by a given job changing between a reference run and a test run) or resulting from transient artifacts not being available to the computing grid 122 after a reference job has been executed.

Although not shown in the same degree of detail, the computing grid 132 and storage 131 hosted by region B 130 could generally include the same components as grid 122 and storage 121 hosted by region A 120.

Figure 2:
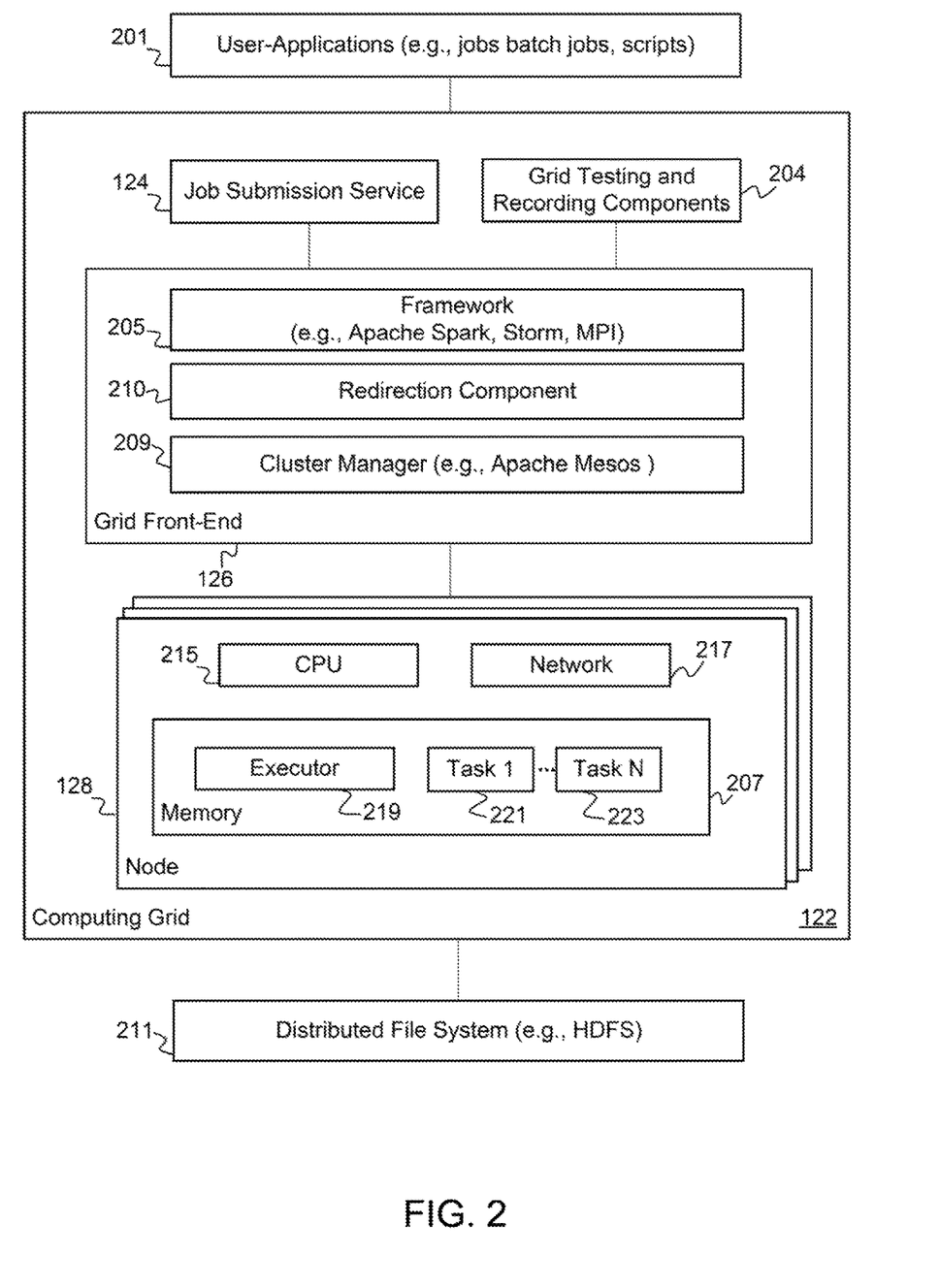
FIG. 2 further illustrates components of a grid computing cluster which supports shadow mode testing, according to one embodiment.

FIG. 2 further illustrates components of a computing grid 122 which supports shadow mode testing, according to one embodiment. As shown, a user job 201 may generally include a grid application 109 built for a given cluster framework 205 (e.g., an Apache Spark application), descriptions of input and output sources, and copies of (or references to) any supporting artifacts or resources which, collectively, define a parallel computing job that may be executed on the computing grid 122. As described above, in one embodiment, user job 201 may be packaged using a job container which provides a fully-specified description of the user job 201. Data used by nodes 128 while performing user jobs 201 (and results of such data processing) may be stored in a distributed file system 211, such as an instance of the HDFS file system accessible to the nodes 128 of the computing grid 122. Similarly, the job submission service 124 may store a copy of a user job 201 in the distributed file system 211 as needed for testing and recording components 204 to later replay user job 201.

As shown, the grid 122 includes the grid front-end 126, the job submission service 124, grid testing and recording components 204, one or more frameworks 205, cluster manager 209, redirection component 210, and grid nodes 128. The job submission service 124 receives user job 201. In one embodiment, the job submission service 124 creates a copy of selected user jobs 201 in order for such jobs to later be replayed on different instances of computing grid 122 (e.g., after grid components are updated).

In addition, the job submission service 124 may pass user job 201 to the grid front-end 126, which launches the user job 201 for execution by the computing grid 122. Assume for example, the framework 205 and the cluster manager 209 are implemented using the Apache Spark framework and the Mesos cluster manager. In such a case, the Spark framework 205 executes a grid application 109 included in user job 201 by scheduling tasks for the Mesos cluster manager 209 to launch on the grid nodes 128. More specifically, the Mesos cluster manager 209 sends the Spark framework 205 offers of resources available on the computing nodes 128 (e.g., available processing cores and memory). In turn, the Spark framework 205 schedules tasks of the grid application 109 for execution on the nodes 128 using some (or all) of the offered resources on a given node 128. Once a given task is scheduled, the Mesos cluster manager 209 sends that task to the appropriate node 128, which then allocates the resources to the framework's executor (i.e., the process which performs the tasks) on that node 128 and launches the actual task. Once complete, the executor can free the resources allocated to the task and report what resources are then currently available on the node back to the Mesos cluster manager 209. Note, in practice, the Mesos cluster manager 209 uses one of the nodes 128 as a master node which determines what resources to offer to a framework 205 based on an allocation policy. That is, the master node may determine how many resources to offer to given framework 205 and multiple frameworks 205 (and user grid applications 209) may be running in parallel. In turn, each framework 205 decides whether to use any the offered resources.

As shown, each node 128 includes one or more CPUs 215 (or processing cores) memory 207, and a network interface 217, and the memory 207 includes an executor 219 and tasks assigned by the cluster manager 209 (labeled as task 1 221 and task N 223). Generally, the executor 219 provides a process launched on node 128 for each respective grid application 109. The executor 219 runs tasks (e.g., tasks 221, 223) associated with grid application 109 and saves output data in memory 207 or distributed file system 211 across tasks.

In one embodiment, while executing a grid application 109 included in a user job 201, the grid testing and recording components 204 may record how tasks are dispatched by the framework 206 and the cluster manager 209 to the compute nodes 128 of the grid. That is, when tasks 221, 223, are distributed to one of the nodes 128, the grid testing and recording components 204 may capture and store information describing how each task was processed by the grid 122. For example, the recording components 204 may capture the inputs and execution logic specified by each task dispatched to a node 128 and store the captured information in distributed file system 111 (or other persistent store). The testing and recording components 204 may also capture an indication of which node each task was dispatched to and what resources were allocated to perform each task (such as CPU cores and memory). Further, the testing and recording components 204 may also capture and store the output generated by each task (e.g., changes written to an RDD by the task).

The information captured by the testing and recording components 204 allows the sequence of tasks used to execute grid application 109 to be replayed. In one embodiment, e.g., the testing and recording components 204 may replay the job 201. To do so, the testing and recording components 204 may set up a new run of the user job 201 based on the information captured by the job submission service 124 fully describing the user-level aspects of the user job 201 such as scripts, resources, or other artifacts required by user job 201. In addition, the new run of user job may be set up according to the description of input data sources, output data locations, etc. submitted to the job submission service 124. Once prepared, the user job 201 may then be replayed on a computing grid (e.g., an instance of grid 122 after updating the executer 219 on each of the nodes 128) by dispatching tasks to nodes of the computing grid 122 based on the sequence of tasks captured and stored by the testing recording components 204 during the prior run of user job 201.

In addition to replaying user job 201, a redirection component 210 of the cluster manager 209 may redirect a job submitted for execution on a specified computing cluster to a different cluster. For example, a job may be submitted with URI identifying a cluster to execute the job. Typically, the redirection component 210 may pass the job to the cluster specified by the URI. However, the redirection component 210 could also submit the job to another cluster (either in addition to or as an alternative to the requested cluster). For example, the redirection component could send the job to a cluster with nodes running a production instance of application on the nodes 128 (as requested in a job submission) as well as to a cluster with nodes running a new release candidate of such applications. This approach may allow, e.g., a clone of grid 122 or clone of grid nodes 128 to be implemented on different computing hardware and evaluated without having to clone the grid front-end applications or to perform both a reference run of user job 201 (on grid 122) and to replay that run on an alternative grid.

Figure 3:
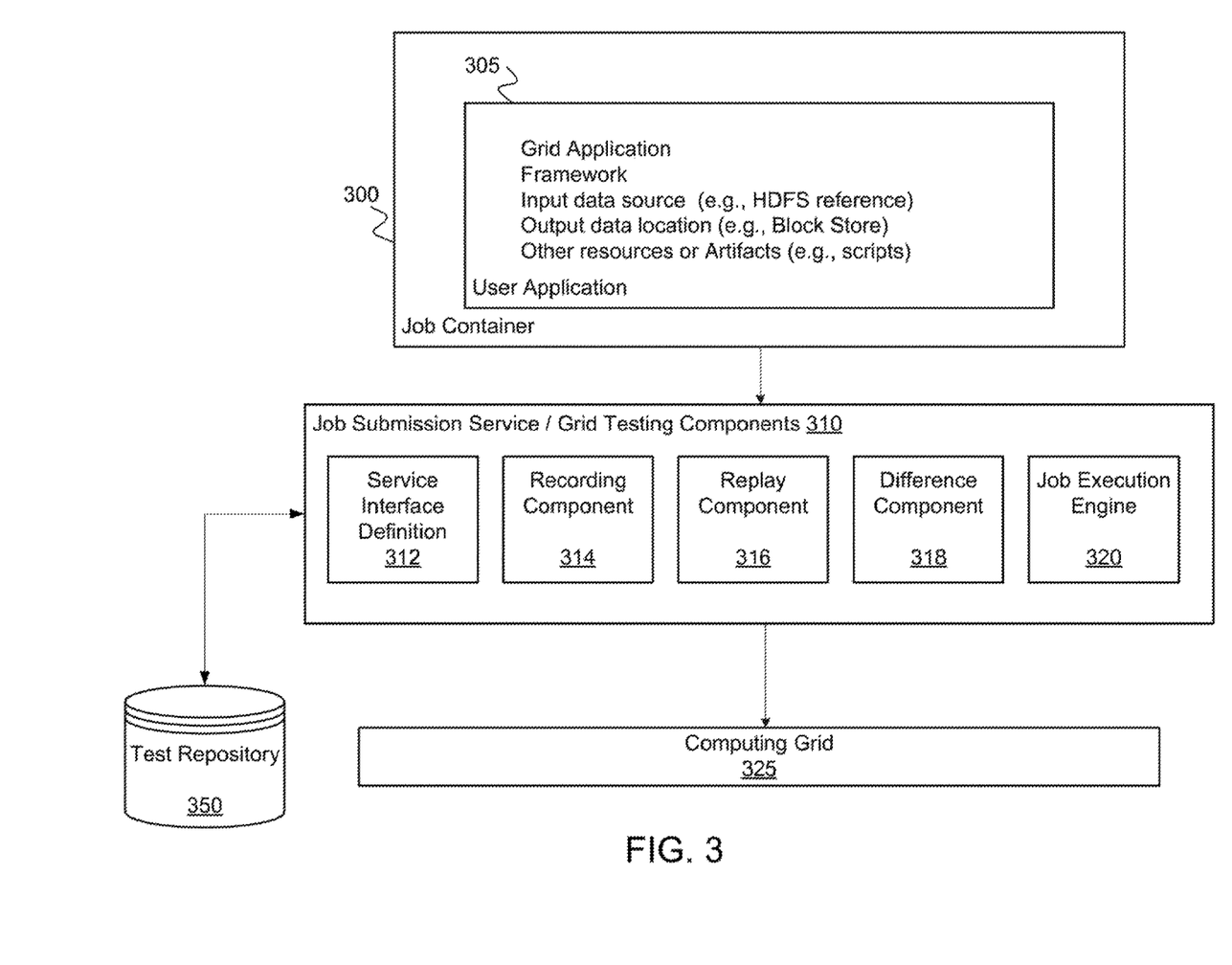
FIG. 3 further illustrates the job submission service and grid testing components discussed above being used to capture and later replay a user job launched on a parallel computing grid, according to one embodiment.

FIG. 3 further illustrates the job submission service and grid testing components 310 discussed above being used to capture and later replay a user job 305 launched on a parallel computing grid 325, according to one embodiment. As shown, a job container 300 stores a user job 305. In turn, the user job 305 specifies a grid application, a cluster framework (e.g., a URI), input data sources (e.g., an RDD) and output data locations (e.g., block storage volumes or objects) used by the grid application (or output storage requirements used to select output data locations), and any other resources or artifacts needed to execute the user job 305. As noted, the user job 305 in container 300 may provide a fully-specified description of a parallel computing job as needed to both execute the job 305 as well as to later replay the job 305.

Illustratively, the job submission service and grid testing components 310 include a service interface definition 312, a recording component 314, a replay component 315, and a difference component 318. In one embodiment, the service interface definition 312 specifies format and content requirements for submitting a parallel computing job to the job submission service using a job container 300. For example, the service interface definition 312 may specify required components, such as the grid application itself, parameters for a framework on which the grid application is based, and an indication of inputs and outputs for the grid application. In addition, the service interface definition 312 may allow a developer to specify other information needed to execute a given parallel computing job, such as copies (or resolvable references) to any scripts, objects or other artifacts which could change between runs of the parallel computing job.

In addition, the service interface definition 312 may specify network endpoints for submitting the job container 300 to the job submission service along with APIs and parameters used to signal to the components 310 whether the execution of user job 305 should be recorded (allowing user job 305 to later be replayed) as well as APIs and parameters to launch the user job 305 on a computing grid. For example, such APIs may be used to request that components 310 launch the user job 305 on computing grid 325.

The recording component 314 generally corresponds to one or more applications used to capture and store the user job 305, as needed to later replay user job 305. For example, the recording component 314 may capture a copy of the grid application, along with input and output information specified in the user job 300. The recording component 314 may also resolve references to any external content (and capture a copy of such content) needed to later replay the user job 305. In one embodiment, the recording component 314 may store information from the user job 305 in test repository 350. Further, the recording component 314 may record an indication of computing tasks dispatched to individual nodes of the computing grid 325 when executing job 305. As noted, computing 314 may capture a copy of the task logic, input data, node identifiers, output data objects or locations, and node resources allocated by a node to execute the task. As with the user-level job data, the grid-level task information may be stored in the repository 350. In one embodiment, the replay component 316 may be used to replay a computing job 305 on a different instance of computing grid 300.

Further, the results of different runs of the grid may be compared for differences in order to evaluate different configurations or versions of applications used by the computing grid 325. The difference component 318 generally corresponds to one or more applications used to compare the results of different runs of a parallel computing job (e.g., user job 305). In one embodiment, the difference component 318 may compare the results of a reference run of job 305 recorded while executing user job 305 on computing grid 325 with results captured by replaying the user job 305 on another computing grid. For example, the reference run could provide results obtained in running the user job 305 using a production instance of computing grid 325 and the candidate results could be obtained by replaying the reference run on a test or development instance of the computing grid 325.

Figure 4:
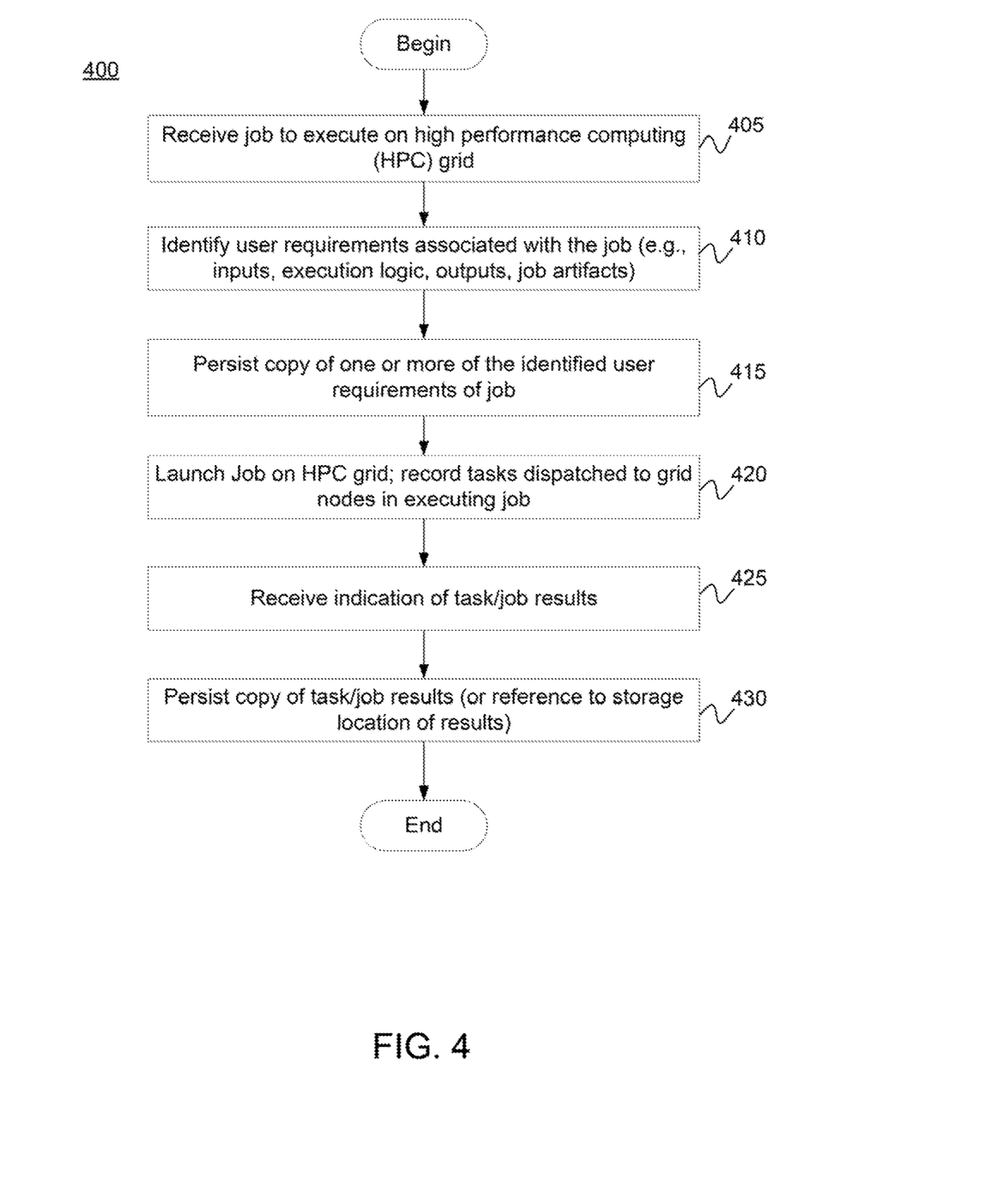
FIG. 4 illustrates a method for recording a computing job submitted to a parallel computing grid, according to one embodiment.

FIG. 4 illustrates a method 400 for recording a computing job submitted to a parallel computing grid, according to one embodiment. As shown, the method 400 begins at step 405 where a job submission layer receives a parallel computing job to execute on a high performance computing (HPC) grid or cluster. In response, at step 410, the job submission layer may identify user-level requirements or job dependencies specified by the user job which are needed to execute the parallel application on the computing grid. As noted, the computing job may include a grid application built for a given cluster framework (e.g., an Apache Spark Application) along with an indication of an input data source (e.g., a Resilient Distributed Dataset (RDD) stored in an HDFS file system accessible to the computing grid) and output data locations or objects. The computing job may also specify any additional requirements or dependencies needed to replay the computing job, such as instances of scripts that could be modified between runs of the computing job or instances of job resources or artifacts that are available only locally to the user submitting the computing job. At step 415, the user-level information identified at step 405 may be captured and stored by the job submission layer, allowing the computing job to later be accurately replayed. The job submission layer may store such information in a local database or storage volume. For example, assume a parallel computing task is developed to evaluate natural language content, such as a corpus of spoken utterances submitted to a voice command system or evaluate a corpus of short text messages published to a social network service. In such a case, the parallel computing task could be used to identify trends, correlations or other information related to the spoken utterances or the short text message (or correlations between both). And the recording component could capture an instance of the grid application used to evaluate the natural language content, along with a reference to an input data source (e.g., an RDD generated to store this data).

At step 420, the job submission layer may launch the parallel computing job on the HPC grid or cluster. In one embodiment, a recording component may capture grid-level information describing how the computing grid executes the computing job. Doing so allows the execution of the computing job to later be replayed on different HPC grids or clusters or using different versions of the underling grid applications or systems. For example, a recording component may record how a cluster framework (e.g. Apache Spark) and cluster manager (e.g., Apache Mesos) dispatches tasks and allocates resources for such tasks to nodes of a computing grid. Of course, the information captured by the recording components may be tailored as needed for a variety of other cluster frameworks and/or cluster management tools.

At step 425, a recording component may receive an indication of the output generated by the parallel computing job. Returning to the example of a parallel computing task used to evaluate natural language content, the output may provide a collection of objects or data stored by the grid computing application indicating what trends or correlations were identified in the underlying data set. In addition, the output of one or more tasks dispatched to the nodes may be captured. For example, the recording component may capture a random (or other) sampling of output generated by tasks dispatched to the grid nodes. At step 430, the recording component may persist a copy of the job results generated by executing parallel computing job, e.g., to provide a reference result for comparing with job results obtained by replaying the parallel computing job against other computing tasks.

Figure 5:
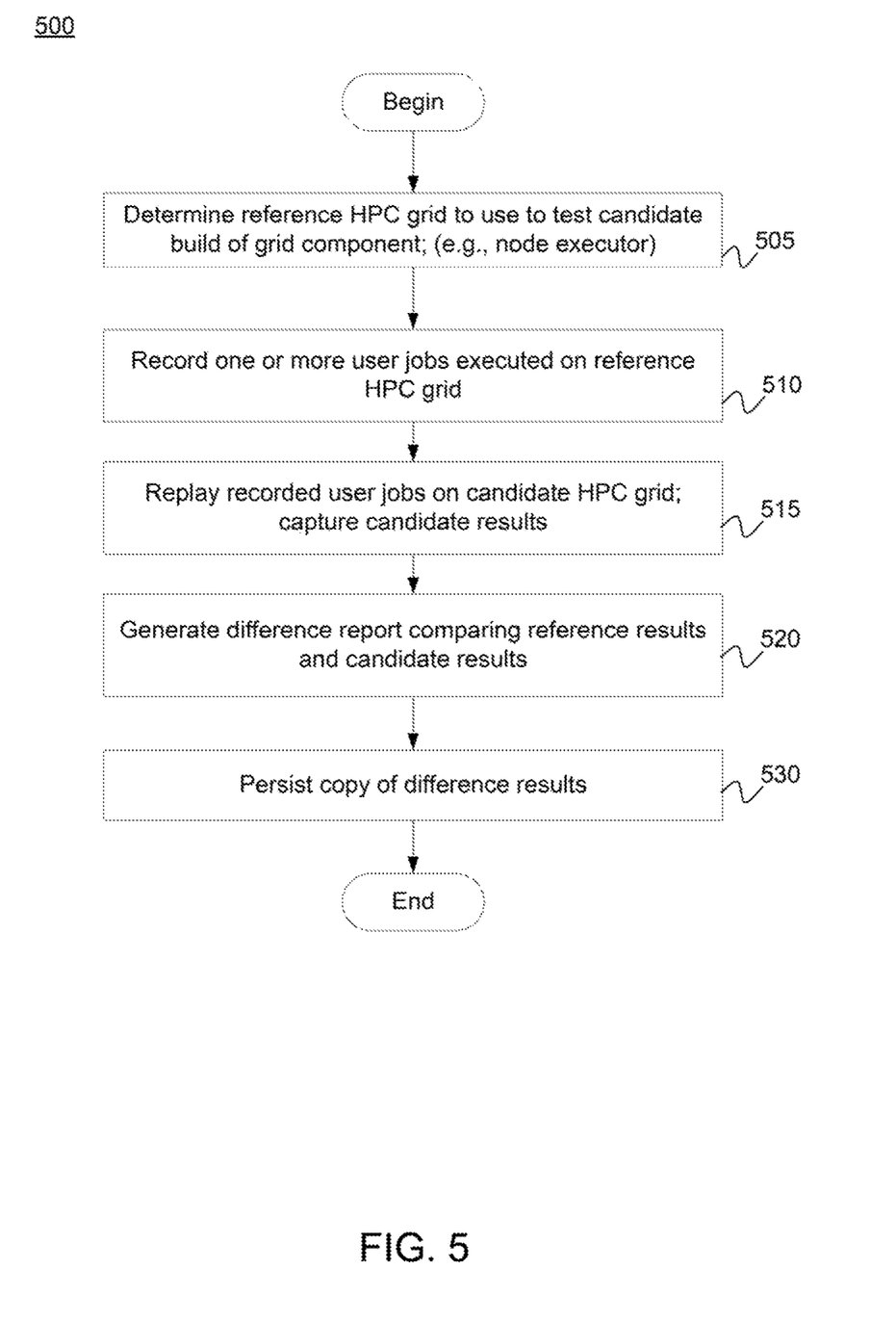
FIG. 5 illustrates a method for evaluating a computing grid by replaying a computing job submitted to that computing grid, according to one embodiment.

FIG. 5 illustrates a method 500 for evaluating a candidate HPC computing grid by replaying one or more computing jobs executed by a reference HPC computing grid, according to one embodiment. As shown, the method 500 begins at step 505 where a user specifies a reference instance of an HPC computing grid and a candidate instance of an HPC computing grid. As noted, for example, the user could specify a current production build of an executor application deployed to nodes of an HPC computing grid as the reference instance. And the user could specify an update or revision to the production build to use as the candidate instance of the computing grid.

At step 510, one or more computing jobs executed on the reference HPC grid may be recorded. The amount and type of the job data recorded for the reference HPC grid may be tailored as a matter of preference. For example, a specified percentage of production jobs submitted over a certain period of time could be recorded or specifically identified jobs submitted to the reference HPC grid could be recorded. Further, as noted, user-level aspects of the computing jobs may be recorded, such as a copy of one or more grid applications submitted for execution on the reference HPC grid, along with input data sources, output data locations, and related artifacts. In addition, grid-level aspects of each computing job executed on the reference HPC grid may be recorded, such as a description of tasks dispatched to nodes of the computing grid during job execution.

At step 515, user jobs executed on the reference HPC grid may be replayed on the candidate HPC grid. Results from replaying the jobs on the candidate HPC grid may be captured and stored. The candidate HPC grid could, e.g., be running updated applications of the framework, cluster manager, or node executor. In such a case, the job could be replayed to test whether the candidate grid generates the same results generated by the reference grid. In other cases, the reference HPC grid and candidate HPC grid could be the same. That is, once the computing job is captured, it could be replayed on the same grid. For example, the job could be replayed against the reference HPC grid periodically to ensure the reference HPC grid produces the same results each time the job is replayed. In another case, the job could be replayed against the same grid and the results of the replay compared with the results of the original run. Doing so could identify differences between the original run and the replay resulting from aspects of the computing job results that changed each time the job is run. Such output could be filtered from the results generated by the replay, leaving a set of job output that can be compared with each run of the computing job on different clusters or clusters running different versions of the underlying grid software applications (e.g., a node executor, framework, or cluster manager).

At step 520, results of executing the user jobs on the reference HPC grid may be compared with the results obtained by replaying the same user jobs on the candidate HPC grid. In one embodiment, the output of the computing job generated by the reference HPC grid is compared with output generated by the candidate HPC grid. This approach may be useful where a large, parallel computing job produces output results with a data size or type that allows the results to be compared. In other cases, the output of individual tasks dispatched to nodes of a cluster could be compared. However, the scope of many parallel computing jobs may make either capturing or comparing the output of each task dispatched to a node impractical. Instead, in one embodiment, the output of individual tasks may be sampled while recording the computing job. In such a case, the output of the same tasks may be captured while replaying the computing job for comparison. Of course, a variety of reports may be generated to characterize differences between the output generated by the reference HPC grid and candidate HPC grid. At step 530, a copy of the difference report may be saved for review.

Figure 6:
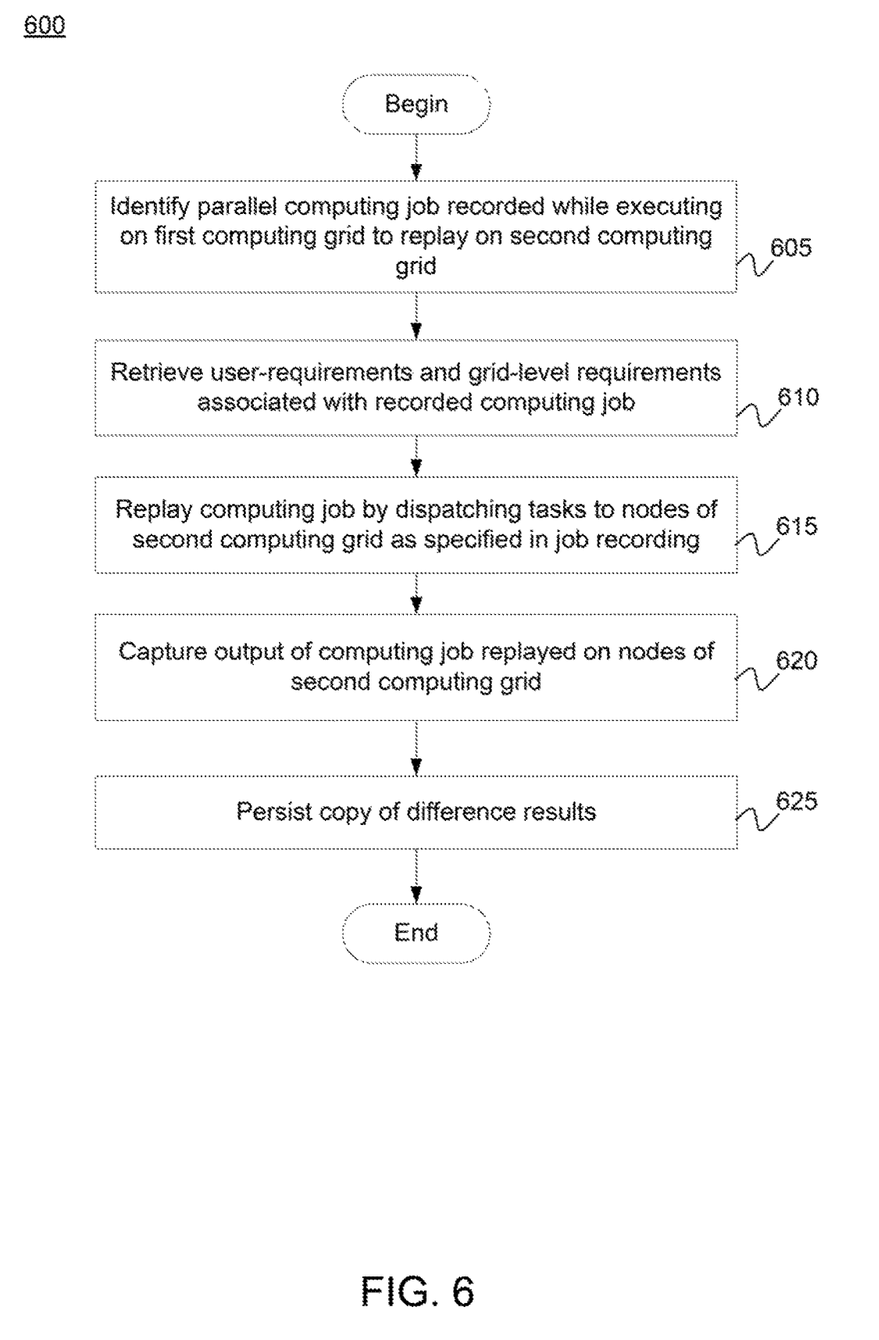
FIG. 6 illustrates a method for replaying a grid computing job, according to one embodiment.

FIG. 6 illustrates a method 600 for replaying a grid computing job, according to one embodiment. As shown, the method 600 begins at step 605, where the replay component identifies at least a first parallel computing job recorded while executing on a first instance of a parallel computing grid to replay on a second instance of a parallel computing grid.

At step 610, a replay component retrieves user-level requirements associated with the first parallel computing job. As noted, the user-level requirements may specify dependencies captured by a job submission service when the first parallel computing job was submitted to the service for execution. In addition, any resources, scripts, or artifacts needed to replay the first parallel computing job may be retrieved. Once retrieved, the user-level requirements may be used to prepare or stage the first parallel computing job to be replayed on the second instance of a parallel computing grid. For example, a storage location for output of the replayed computing job could be mounted or otherwise initialized. At step 615, the first computing job is replayed on the second instance of a parallel computing grid. In one embodiment, the computing job is replayed by dispatching tasks to nodes of the second instance of a parallel computing grid as specified in a recording of the parallel computing job captured while the job was executed on the first instance of a parallel computing grid.

At step 620, the replay component captures the output of the first parallel computing job generated by dispatching the tasks to the nodes of the second computing grid. At step 625, output generated by replaying the first parallel computing task on the second computing grid may be stored, e.g., for comparison with a set of reference results captured while executing the first computing task on the first instance of a parallel computing grid.

Figure 7:
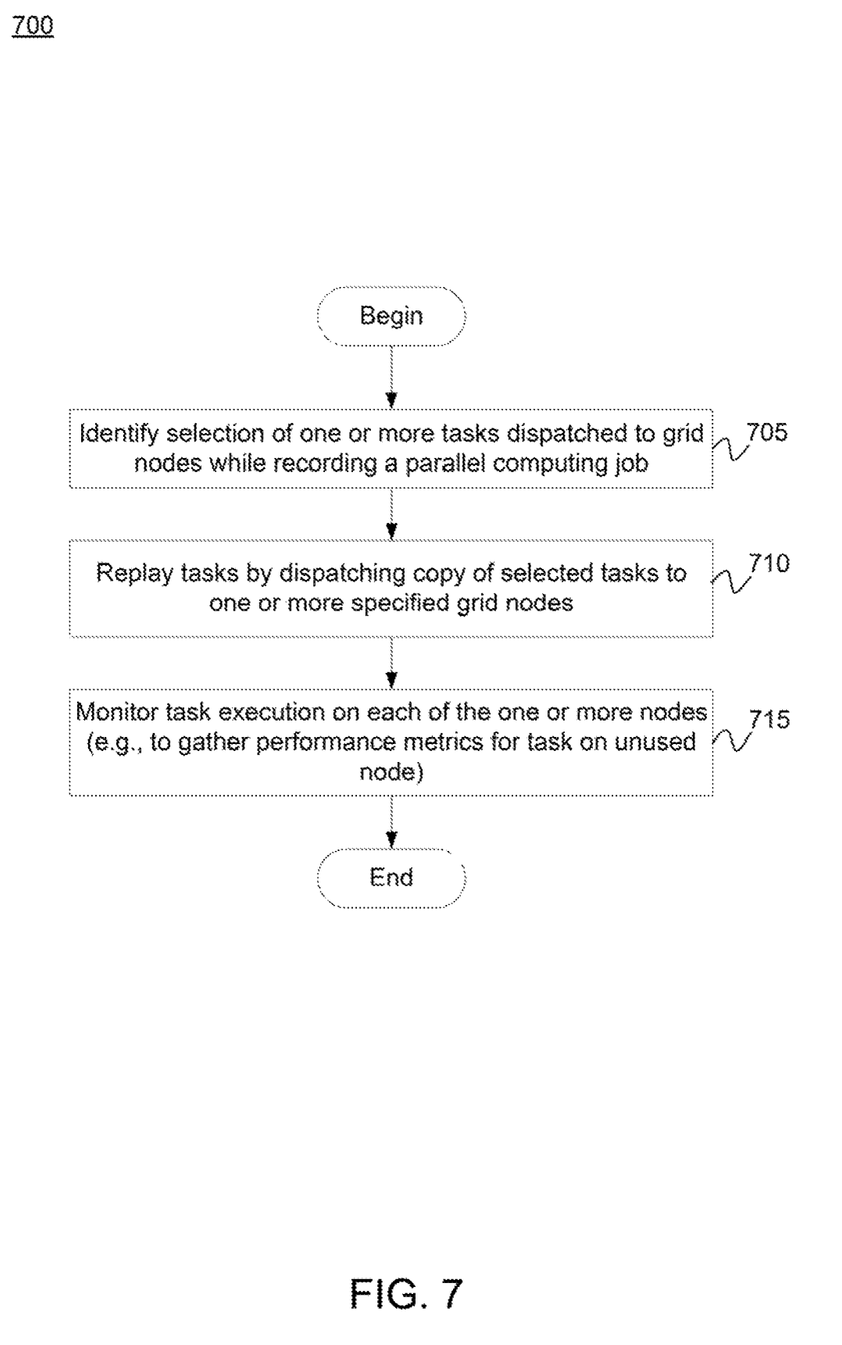
FIG. 7 illustrates a method for replaying certain tasks dispatched to a parallel computing grid, according to one embodiment.

FIG. 7 illustrates a method 700 for replaying certain tasks dispatched to a parallel computing grid, according to one embodiment. At step 705, a replay component may identify a selection of one or more tasks dispatched to nodes of a first parallel computing grid while executing a first computing job. At step 710, the replay component may replay the one more tasks on specified nodes of a grid computing system. At step 715, the replay component may monitor task execution on each grid node replaying the selected one or more tasks. For example, the replay component could replay a task on an otherwise unused or idle node of a computing grid. Doing so allows detailed performance metrics to be captured for that task. As another example, the one or more tasks could be replayed on different configurations of hardware and software used by a grid node, e.g., to control for grid-state when testing performance changes.

Figure 8:
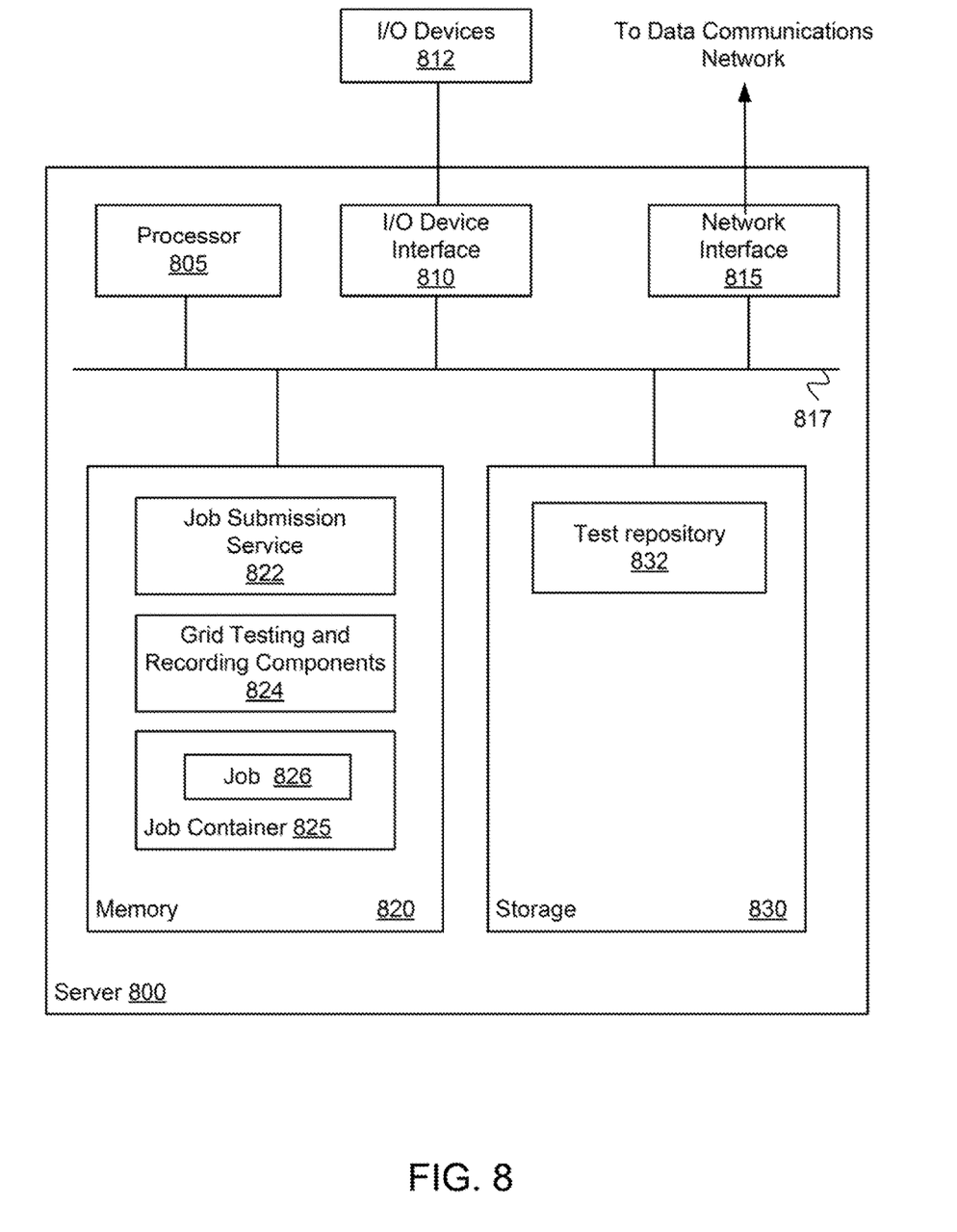
FIG. 8 illustrates an example computing system used to host components of a job submission service used to capture and replay computing jobs submitted to a grid computing system, according to one embodiment.

FIG. 8 illustrates an example computing system used to host components of a job submission service and job capture and replay components, according to one embodiment. As shown, the computing system 800 includes, without limitation, a central processing unit (CPU) 805, a network interface 815, a memory 820, and storage 830, each connected to a bus 817. Computing system 800 also includes an I/O device interface 810 connecting I/O devices 812 (e.g., keyboard, display and mouse devices) to the computing system 800. In context of this disclosure, the components shown in computing system 800 correspond to both physical computing systems (e.g., a system in a data center) as well as components of a virtual machine (VM) instance executing within a computing cloud. Further, a cloud computing service provider could offer components of the deployment manager as web services accessed using a network browser or dedicated console application. Further still, while shown as running on a single computing server 800, components in memory 820 and storage 830 may be deployed across multiple computing servers.

CPU 805 retrieves programming instructions and application data stored in the memory 820 and storage 830. The interconnect 718 is used to transmit programming instructions and application data between the CPU 805, I/O device interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes a job submission service 822, grid testing and recording components 824, and a job container 825 submitted to the job submission service 822. Storage 830 includes a test repository 832. As described, the job container 825 may be used to provide a fully-specified description of a parallel computing job 826 to execute on an HPC grid or cluster. Accordingly, the job 826 may specify a grid application, data inputs used by the job 826, outputs where results of the grid application are stored, along with any resources, scripts, or artifacts needed to replay the job 826 after being recorded by the grid testing and recording components 824. Once the job 826 is submitted to an HPC grid for execution, the grid testing and recording components 824 may record a description of each task dispatched to a node of the HPC grid. In one embodiment, the recorded description may indicate what node of the grid a given task was dispatched to, what resources were allocated to the task (e.g., CPU and memory resources) and an indication of the task itself. The resulting task descriptions may be stored in test repository 832. In addition, the grid testing and recording components 824 may capture a copy of output produced by the job 826. As noted, in one embodiment, the results of executing the job 826 on one computing grid (e.g., a grid running a production build of grid components) may be compared to results generated by replaying the job on a second computing grid (e.g., a grid running a release candidate build of grid components).

Advantageously, at least some embodiments of the techniques disclosed herein provide approaches for testing a computing grid that are scalable, accurate, and effective.

Because grid computing jobs change regularly and often include dependencies, capturing a fully specified job description allows a parallel computing job to be replayed with high-fidelity—both from a user-level perspective of the job submitted to the computing grid and from a grid-level perspective of tasks dispatched to nodes of the computing grid when executing the parallel computing job. Thus, the results of executing a parallel computing job on a reference computing grid may be compared with results obtained by replaying the parallel computing job on a candidate computing grid. Doing so helps ensure that changes or updates to grid applications are effectively tested before being put into production use.

The scope of the present disclosure is not limited to any specifically described embodiments. Instead, any combination of the foregoing features and elements is contemplated as practicing an embodiment. Furthermore, although embodiments disclosed herein may achieve advantages over other possible solutions or over the prior art, whether or not a particular advantage is achieved by a given embodiment is not limiting of the scope of the present disclosure. Thus, the preceding disclosure of aspects, features, embodiments and advantages are merely illustrative and are not considered elements or limitations of the appended claims except where explicitly recited in a claim. Likewise, any reference to "the invention" should not be construed as a generalization of any inventive subject matter disclosed herein and shall not be considered to be an element or limitation of the appended claims except where explicitly recited in a claim.

Aspects of the present invention may take the form of an entirely hardware embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A computer-readable storage medium storing instructions executable to perform an operation for capturing aspects of a parallel computing job needed to replay the parallel computing job, the operation comprising:

responsive to receiving, from a requesting entity, a computing job to execute on at least a first computing grid, wherein the computing job specifies a grid application, launching the grid application on the first computing grid, wherein the first computing grid includes a plurality of grid nodes and at least two of a cluster framework, a cluster manager, and a node executor;

for one or more tasks dispatched to the plurality of grid nodes of the first computing grid, capturing a description of the task as dispatched to one of the plurality of grid nodes of the first computing grid;

generating a reference result set by capturing output of the computing job generated from multiple executions of the grid application on the first computing grid, wherein the reference result set excludes one or more transient results that differ across the multiple executions;

capturing candidate output by replaying the computing job on a second computing grid by operation of one or more computer processors and based on a captured instance of the grid application and the captured description, wherein the second computing grid contains an updated grid maintenance application selected from an updated cluster framework, an updated cluster manager, and an updated node executor relative to the first computing grid; and identifying, for correction, an issue with the updated grid maintenance application by comparing the candidate output against the reference result set, whereafter the identified issue is corrected.

2. The computer-readable storage medium of claim 1, wherein the second computing grid replays the computing job by:

launching the captured instance of the grid application on the second computing grid, for each of the one or more tasks dispatched to the plurality of grid nodes of the first computing grid, dispatching a corresponding task to one of a plurality of grid nodes of the second computing grid, based at least on the description of the task as dispatched to one of the plurality of grid nodes of the first computing grid, and capturing an indication of an output of the computing job generated by replaying the computing job on the second computing grid.

3. The computer-readable storage medium of claim 1, wherein the computing job further includes an indication of at least a first dependency requirement needed to execute the computing job on the first computing grid and wherein the operation further comprises, capturing an instance of the first dependency requirement to use in replaying the computing job on the second computing grid.

4. The computer-readable storage medium of claim 1, wherein the computing job further includes an indication of one or more input data sources and at least a first storage location used to store the output of the computing job generated by executing the grid application on the first computing grid.

5. The computer readable storage medium of claim 1, wherein the description of the task as dispatched to one of the plurality of grid nodes of the first computing grid comprises at least an indication of resources allocated on the grid node to which the task is dispatched and task logic to execute on the grid node.

6. The computer-readable storage medium of claim 1, wherein the first computing grid includes the cluster framework, the cluster manager, and the node executor, wherein the cluster framework schedules tasks for execution on the plurality of grid nodes, wherein the cluster manager allocates available resources to the first computing grid to perform the computing job and dispatches the tasks to grid nodes, of the plurality of grid nodes, as scheduled by the cluster framework, wherein the node executor executes the tasks on the grid nodes;

wherein the computing job is replayed absent any request from the requesting entity to replay the computing job, wherein the multiple executions of the grid application on the first computing grid are performed absent any request from the requesting entity to execute the computing job more than once;

wherein the operation is performed by a grid testing application having a plurality of components including a recording component, a replay component, and a difference component.

7. The computer-readable storage medium of claim 6, wherein the recording component is configured to capture the description of the task as dispatched to the one grid node, wherein the replay component is configured to replay the computing job on the second computing grid, wherein the difference component is configured to compare the candidate output against the reference result set;

wherein the one grid node of the first computing grid executes tasks associated with multiple computing jobs, wherein the operation further comprises:

capturing one or more performance metrics associated with the computing job absent any request from the requesting entity to capture a performance metric, wherein the one or more performance metrics are captured by executing the computing job on the second computing grid when the second computing grid is exclusively executing the computing job, wherein the captured one or more performance metrics are more reflective of the computing job than any performance metric capturable from the first computing grid.

8. The computer-readable storage medium of claim 7, wherein the second computing grid replays the computing job by:

launching the captured instance of the grid application on the second computing grid, for each of the one or more tasks dispatched to the plurality of grid nodes of the first computing grid, dispatching a corresponding task to one of a plurality of grid nodes of the second computing grid, based at least on the description of the task as dispatched to one of the plurality of grid nodes of the first computing grid, and capturing an indication of an output of the computing job generated by replaying the computing job on the second computing grid.

9. The computer-readable storage medium of claim 8, wherein the computing job further includes an indication of at least a first dependency requirement needed to execute the computing job on the first computing grid, wherein the operation further comprises capturing an instance of the first dependency requirement to use in replaying the computing job on the second computing grid;

wherein the computing job further includes an indication of one or more input data sources and at least a first storage location used to store the output of the computing job generated by executing the grid application on the first computing grid;

wherein the description of the task as dispatched to one of the plurality of grid nodes of the first computing grid comprises at least an indication of resources allocated on the grid node to which the task is dispatched and task logic to execute on the grid node.

10. The computer-readable storage medium of claim 9, wherein the cluster framework further schedules an allocation of resources for tasks scheduled for execution by the plurality of grid nodes, wherein the plurality of grid nodes in the first computing grid each execute a production build of the grid application, wherein a plurality of grid nodes in the second computing grid each execute a development build of the grid application.

11. The computer-readable storage medium of claim 10, wherein replaying the computing job on the second computing grid comprises dispatching the one or more tasks to an idle grid node of the second computing grid and executing the one or more tasks on the idle grid node using resources on the idle grid node allocated according to the computing job; wherein operation further comprises:

replaying the computing job on a third computing grid in order to capture one or more performance metrics associated with the computing job, wherein the second computing grid and the third computing grid have each a distinct node configuration relative to one another; and generating a result based on a comparison between the performance metrics captured for the computing job based on the execution of the computing job on the second computing grid and the execution of the computing job on the third computing grid, wherein the result is output.

12. The computer-readable storage medium of claim 11, wherein each computing job comprises a respective parallel computing job, wherein each computing grid comprises a respective parallel computing grid, wherein the plurality of components further includes a service interface definition, wherein the service interface definition specifies: (i) format and content requirements for submitting the parallel computing job to a job submission service using a job container; (ii) grid components, framework parameters, and grid application inputs and outputs; (iii) copies or resolvable references to scripts, objects, and artifacts; (iv) network endpoints for submitting the job container to the grid testing application; and (v) application programming interfaces (APIs) with which to explicitly signal whether computing job capture is to be performed.

13. A system, comprising:
one or more computer processors; and
a memory storing instructions, which, when executed on the one or more computer processors, performs an operation for replaying a parallel computing job, the operation comprising:
identifying a job description of a first parallel computing job that a requesting entity requested to execute, wherein the description includes at least a recording of the first parallel computing job captured while the first parallel computing job was executed on a first instance of a parallel computing grid, wherein the first instance of the parallel computing grid comprises a plurality of grid nodes and at least two of a cluster framework, a cluster manager, and a node executor;
identifying a reference result set generated by capturing output of the parallel computing job resulting from multiple executions of the first parallel computing job on the first instance of the parallel computing grid, wherein the reference result set excludes one or more transient results that differ across the multiple executions;
capturing candidate output by replaying the first parallel computing job on a second instance of the parallel computing grid based on at least the recording, wherein the first parallel computing job is replayed by dispatching tasks to grid nodes of the second instance of the parallel computing grid as specified in the recording of the parallel computing job captured while the first computing job was executed on the first instance of the parallel computing grid, wherein the second instance of the parallel computing grid contains an updated grid maintenance application selected from an updated cluster framework, an updated cluster manager, and an updated node executor relative to the first instance of the parallel computing grid; and
identifying, for correction, an issue with the updated grid maintenance application by comparing the candidate output against the reference result set, whereafter the identified issue is corrected.

14. The system of claim 13, wherein the job description of a first parallel computing job further includes an indication of a grid application launched on the first instance of the parallel computing grid.

15. The system of claim 13, wherein the job description of a first parallel computing job further includes an indication of one or more dependencies needed to replay the first parallel computing job on the second instance of the parallel computing grid.

16. The system of claim 13, wherein the cluster framework further schedules an allocation of resources for tasks scheduled for execution by the plurality of grid nodes.

17. The system of claim 13, wherein the plurality of grid nodes in the first instance of the parallel computing grid each execute a production build of grid software and wherein a plurality of grid nodes in the second instance of the parallel computing grid execute another build of the grid software.

18. A computer-implemented method for replaying certain tasks dispatched to a parallel computing grid, comprising:
responsive to receiving, from a requesting entity, a request to execute a parallel computing job, dispatching a plurality of tasks corresponding to the parallel computing job to a plurality of nodes in the parallel computing grid, wherein the parallel computing grid includes at least two of a cluster framework, a cluster manager, and a node executor;
selecting a first task of the plurality of tasks dispatched to a first grid node of the plurality of nodes while executing the parallel computing job in the parallel computing grid in the parallel computing grid, wherein the first grid node executes tasks associated with multiple parallel computing jobs;
retrieving a description of input data and execution logic associated with the first task dispatched to the first grid node;
replaying the first task on at least a second grid node of the parallel computing grid by operation of one or more computer processors, wherein a grid maintenance application for the parallel computing grid is updated after the first task is executed on the first grid node and before the first task is replayed on the second grid node, wherein the updated grid maintenance application is selected from an updated cluster framework, an updated cluster manager, and an updated node executor; and
capturing one or more performance metrics associated with the first task based on the execution of the first task on the second grid node when the second grid node is exclusively executing tasks associated with the parallel computing job, wherein the captured one or more performance metrics are more reflective of the parallel computing job than any performance metric capturable from the first grid node, wherein an issue with the updated grid maintenance application is identified based on the captured one or more performance metrics and corrected.

19. The computer-implemented method of claim 18, wherein replaying the first task on at least the second grid node of the parallel computing grid comprises:
   dispatching the task to an idle grid node of the parallel computing grid; and
   executing the task on the idle grid node using resources on the idle grid node allocated according to the first task.

20. The computer-implemented method of claim 18, further comprising:
   replaying the first task on at least a third grid node of the parallel computing grid;
   capturing the one or more performance metrics associated with the first task based at least on the execution of the first task on the third grid node, wherein the second grid node and the third grid node have each a distinct node configuration relative to one another; and
   generating a comparison of the performance metrics captured for the first task based at least on the execution of the first task on the second grid node and the execution of the first task on the third grid node.

\* \* \* \* \*